L. P. BIGGERS.
POWER DRIVEN STEERING WHEEL FOR MOTOR VEHICLES.
APPLICATION FILED MAY 12, 1917.

1,264,147.

Patented Apr. 30, 1918.
2 SHEETS—SHEET 1.

WITNESSES
Jas. K. McCathran
Chas. H. Kesler

INVENTOR
Lee P. Biggers,
ATTORNEY

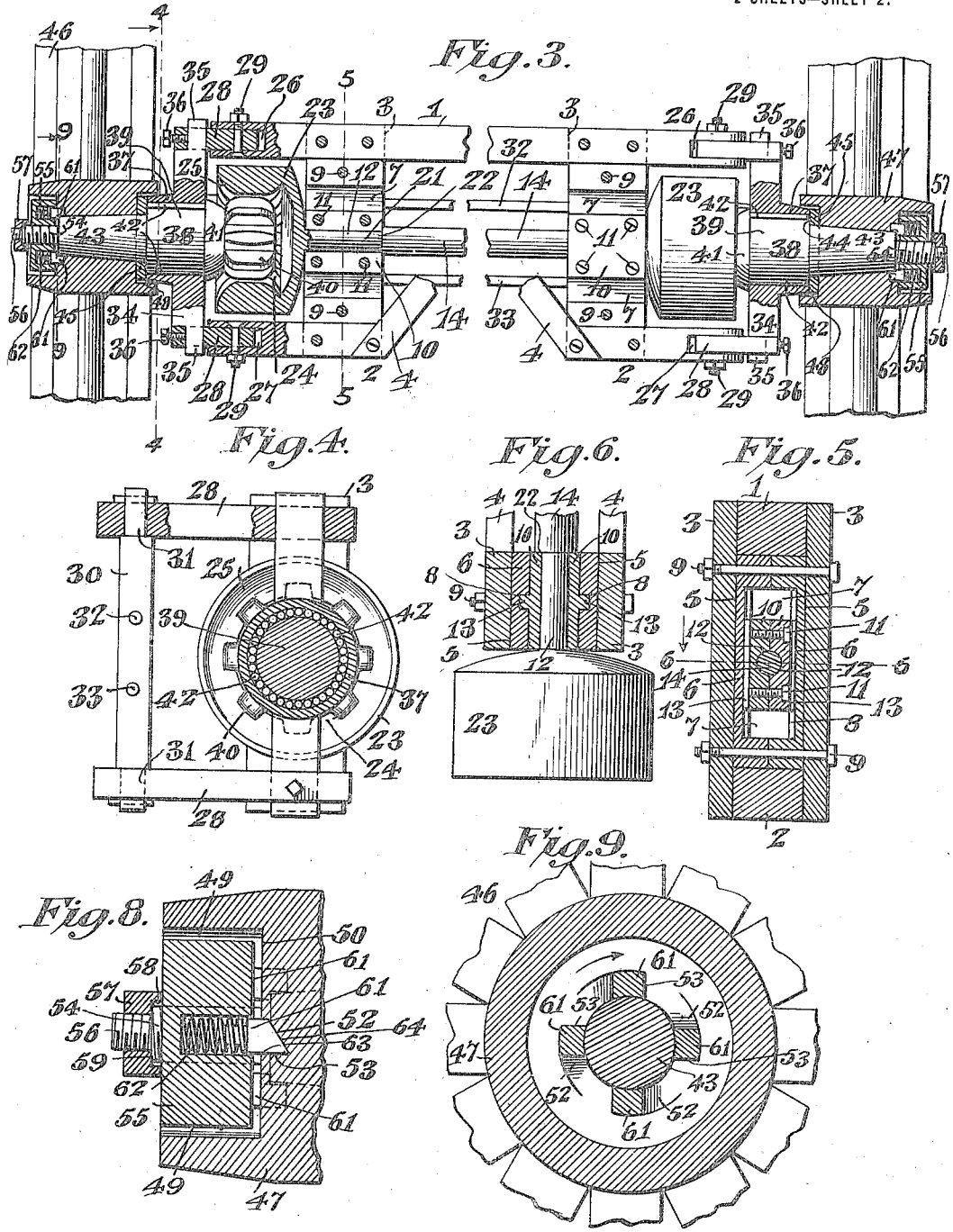

UNITED STATES PATENT OFFICE.

LEE PERKINS BIGGERS, OF PALMERSVILLE, TENNESSEE, ASSIGNOR OF FORTY ONE-HUNDREDTHS TO EDWARD S. BIGGERS AND TEN ONE-HUNDREDTHS TO WALTER G. McWHERTER, BOTH OF PALMERSVILLE, TENNESSEE.

POWER-DRIVEN STEERING-WHEEL FOR MOTOR-VEHICLES.

1,264,147. Specification of Letters Patent. Patented Apr. 30, 1918.

Application filed May 12, 1917. Serial No. 168,274.

*To all whom it may concern:*

Be it known that I, LEE P. BIGGERS, a citizen of the United States, residing at Palmersville, in the county of Weakley and State of Tennessee, have invented a new and useful Power-Driven Steering-Wheel for Motor-Vehicles, of which the following is a specification.

This invention relates to power driven steering wheels for motor vehicles such as automobiles and trucks.

An object of the invention is to provide a cheap, durable, simple construction of few parts, which can be easily attached to existing types of cars and in which the driving mechanism will not interfere with the steering so that the wheels may be turned through a large arc.

Another object of the invention is to provide a construction in which the driving shaft is journaled in bearings which prevent axial movement of the shaft, but which allow vertical movement in order to protect the universal connection or ball and socket gear interposed in the driving or transmission mechanism.

In the accompanying drawings I have illustrated one embodiment of my invention, in which:

Fig. 3 is a front elevation upon a larger scale with parts omitted and with parts in section.

Fig. 4 is a sectional view on the line 4—4 of Fig. 3, looking in the direction of the arrow.

Fig. 5 is a sectional view on the line 5—5 of Fig. 3.

Fig. 6 is a sectional view on the line 6—6 of Fig. 5, looking in the direction of the arrow.

Fig. 8 is a sectional view upon the line 8—8 of Fig. 7, showing an inner nut in engagement with an outer nut.

Fig. 9 is a sectional view on the line 9—9 of Fig. 3, looking in the direction of the arrow.

Figure 1:
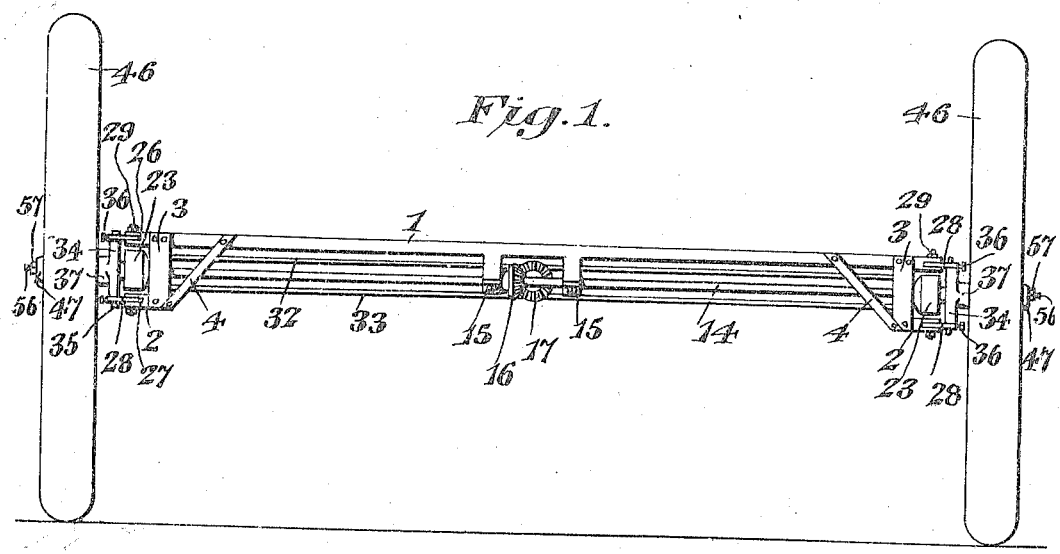
Figure 1 is a front elevation of the forward steering wheels, the body of the vehicle being omitted, parts being shown in section.
Figure 10:
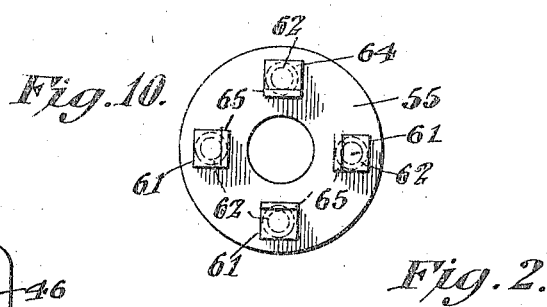
Fig. 10 is a detail view of a dog nut used in the present invention, looking at the inner face thereof.
Figure 11:
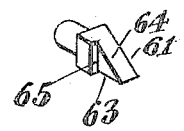
Fig. 11 is a detail view of a dog.

In the embodiment of the invention here illustrated, the vehicle comprises a transversely extending axle 1, which is provided with a fork at each end. Each fork comprises a hanger 2 which is spaced below and parallel with the end of the axle and which is connected at its inner end to the axle inwardly of the end thereof by means of face plates 3 attached to the opposite sides of the axle and hanger. Spaced braces 4 are connected at their lower ends to the lower ends of the face plates and at their upper ends to the opposite sides of the axle 1 at points spaced inwardly from the points of attachment of the face plates thereto.

The axle 1 and hanger 2 with the face plates 3 form an opening 5 in which is fixed a pair of blocks 6 having inner recesses 7 forming a transverse slot therethrough and vertically extending central grooves 8 upon their inner faces. The blocks 6 are secured between the face plates by means of transversely extending bolts 9. A pair of bearing blocks 10 fastened together by means of screws 11 and providing therein a bearing opening 12 is mounted to slide vertically between the blocks 6 in the transverse slot thereof and is retained against transverse movement by means of ribs 13 thereon riding within the grooves 8.

Figure 2:
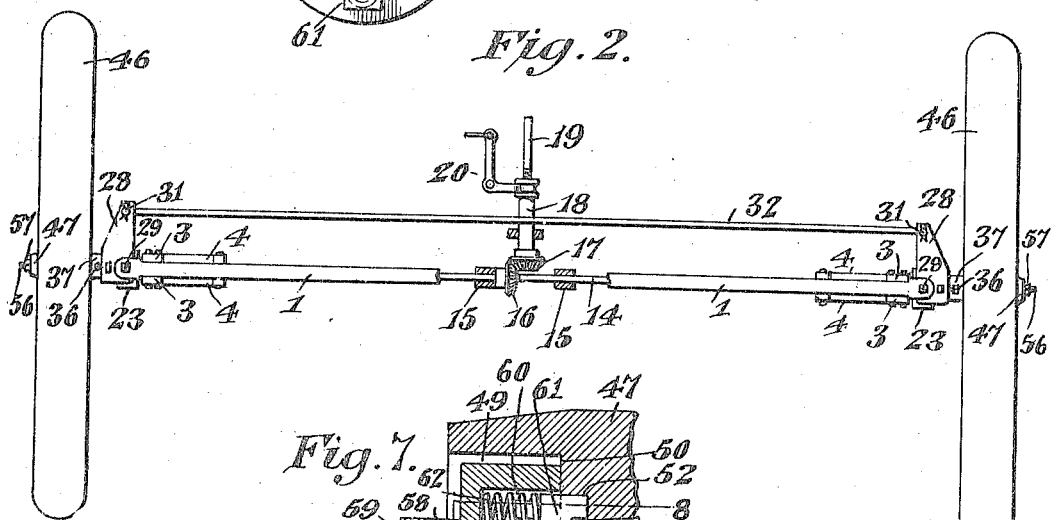
Fig. 2 is a plan view of the same.

A driving shaft 14 is journaled in suitable bearings 15, see Figs. 1 and 2, upon the axle 1 and has a central gear 16 which meshes with a gear 17 fixed to a sleeve 18 slidably connected to and rotatable with a shaft 19 of the transmission for the rear wheels. The sleeve 18 can be actuated to disconnect the front wheels from the source of power by means of a suitable clutch 20. The shaft 14 extends substantially parallel with and below the axle and has at each end a portion 21 of reduced diameter journaled in the bearing opening 12, see Fig. 3, providing an inner shoulder 22 engaging the block 10 at one side and having a socket gear or cog 23 engaging the opposite side of the block 10, whereby the shaft is retained against movement transversely or axially, but is allowed vertical movement. The interior of the socket gear 23 is provided with teeth 24 having longitudinally curved edges, while its outer edge is beveled, as shown at 25.

Each end of the axle 1 and the outer end of the adjacent hanger 2 are bifurcated, as shown at 26 and 27. Rearwardly extending arms 28, see Fig. 2, are pivoted in the bifurcated ends 26 and 27, by means of pivot pins or bolts 29. The rear ends of the arms are connected, see Fig. 4, by means of a post 30 which is pivoted at its ends 31 to the arms. The posts 30 at opposite sides of the vehicle are connected together by means of transversely extending rods 32 and 33 which are arranged in spaced apart relation upon the central portions of the posts 30. The arms 28 at each side are connected at the outer sides of their forward ends by means of a vertical upright 34 fixed at its opposite ends 35 non-rotatably to the arms 28, and retained in position by means of set screws 36. The intermediate portion of the post 34 is provided with a bearing 37 having a transverse opening therethrough.

A spindle 38 comprises a cylindrical portion 39 journaled within each bearing 37. The inner end of each spindle terminates in a ball gear or cog 40 universally mounted within and meshing with the socket gear 23. The said gear has its teeth longitudinally curved as shown in Fig. 3. Interposed between the cylindrical portion 39 and the ball gear or cog is a beveled shoulder 41 which engages the upright at its inner side and is beveled in order to allow the spindle to swing back and forth, the bevel of the socket gear cooperating therewith. Interposed between the inner wall of the bearing 37 of the upright and the cylinder portion 39 of the spindle are anti-friction ball bearings or rollers 42. The outer part of the spindle comprises a conical portion 43 of reduced diameter, which provides a shoulder 44 at the outer end of the cylindrical portion 39. Abutting this shoulder and mounted upon the conical portion of the spindle is a washer 45 which serves to retain the ball bearings or rollers in position. The shoulder 41 serves to retain the ball bearings in place upon the opposite side.

Wheels 46 having hubs 47 are rotatably mounted upon the conical portions 43 of the spindles. The inner end of each hub is recessed, as shown at 48 and incloses the washer 45 and a portion of the bearing 37. The outer end of each hub is also provided with a recess 49, see Fig. 7, the inner wall 50 of which projects beyond the end 51 of the conical portion of the spindle, as clearly shown in Fig. 7. The inner wall 50 of each hub is provided with inclined grooves or slot notches 52 which terminate in shoulders 53, as clearly shown in Fig. 9, the shoulders being arranged at the front of the grooves when the wheel is rotated clockwise, looking at Fig. 9, the direction in which the wheel rotates when the vehicle is to be moved forwardly.

Figure 7:
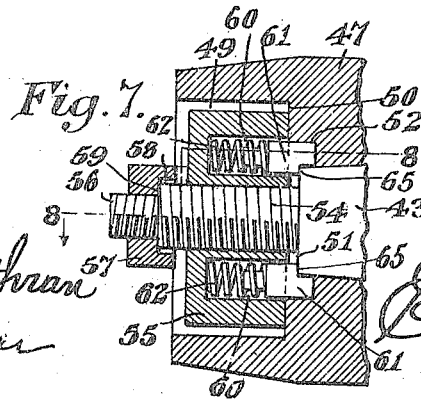
Fig. 7 is a view of the end of the hub shown in Fig. 3, upon a larger scale.

Projecting outwardly from the outer ends of the spindles and fixed thereto are threaded studs 54 of reduced diameter having nuts 55 thereon. As will be clearly seen from Fig. 3, the threads of these studs are so arranged that when the spindles are rotated to move the vehicle forwardly or, for instance, in the direction of the arrow, shown in Fig. 9, the nuts 55 thereon, if held relatively stationary will tighten against the inner walls 50 of the recesses 49 and against the hubs. The studs 54 are of sufficient length to allow the nuts 55 to move inwardly and outwardly thereon to engage and disengage the hubs. Fixed to the outer end of each stud 54 is a threaded stud 56 of reduced diameter upon which the threads are arranged in reverse relation to the threads of the larger stud to which it is attached, as shown in Fig. 7. A nut 57 is threaded upon each stud 56 and is provided with an inner recess 58 which allows the same to be adjusted over the larger stud. It will be noticed that as the inner nut 55 moves outwardly that it will engage the nut 57, see Fig. 8, and then any further rotation of the inner nut will tend, by reason of the reverse threads upon the two studs, to tighten the outer nut against a shoulder 59 of the larger stud, so that the nuts will be locked.

Each nut 55 is provided upon its inner face with a plurality of recesses 60 in which are slidably mounted dogs 61 which are normally held projected by means of springs 62. These dogs are provided with outer points having straight faces 63 at right angles to the direction of rotation and faces 64 inclined relatively thereto. Looking at Fig. 8, it will be seen that the faces 63 are arranged at the front, the nut 55 rotating in clockwise direction, while the inclined faces are arranged at the rear. The dogs are held projected by the springs and ride within the inclined grooves 52. The inner portions of the dogs adjacent the spindle are cut away, as shown at 65, Fig. 7, in order to fit the inner ends of the spindle.

When the machine is moving forwardly, the spindle will rotate clockwise or in the direction of the arrow shown in Fig. 9. The speed of rotation of the spindle will exceed the rotation of the hub or wheel, and the nut 55 with the dogs will rotate with the spindle and the faces 63 of the dogs will engage the shoulders 53 whereby the nut 55 will be retarded and will be tightened up against the hub, locking it to the spindle and to the washer 45, and the dogs will also engage the shoulders 53 to rotate the wheel and retain it fixed to the spindle.

When it is necessary to back up the machine, it is desirable to disconnect the power from the front wheels. For this purpose, I have provided the above described construction, whereby the wheels rotate freely upon their spindles when the machine is backing up. When this free rotation occurs, the inclined faces 64 of the dogs simply ride in the inclined grooves 52, and snap over but do not engage the shoulders 53 of the hub. Furthermore, when the rotation of the spindle is counter-clockwise, the nut 55 tends to move outwardly out of engagement with the hub and into engagement with the outer nut, as shown in Fig. 8. The inner and outer nuts of each hub and spindle coöperate to form a lock so that the parts are held securely together, so that the nuts will not drop off, and so that there is very little lost motion or looseness.

While I have shown and described one embodiment of my invention, it is to be understood that I do not desire to be limited to the details of construction herein shown and described, for obvious modifications will be apparent to anyone skilled in the art.

What is claimed is:—

1. The combination with a shaft having a socket gear provided with longitudinally curved edges, and having its outer edge beveled, a movable element provided with a ball gear at its inner end meshing with the socket gear, and also having its teeth longitudinally curved, and a beveled shoulder provided on said element contiguous to the ball gear to coöperate with the beveled edge of the socket gear.

2. The combination with an axle having a fork at one end, of a power shaft journaled upon said axle and having a socket gear in said fork, a bearing pivoted to said fork outside of said socket gear, means for preventing axial movement of said power shaft but allowing vertical movement thereof, a spindle rotatably mounted in said bearing and having a ball gear meshing with said socket gear, and a wheel on said spindle.

3. The combination with an axle, of a shaft journaled in said axle and extending substantially parallel therewith, said shaft being substantially immovable transversely or axially of itself but movable vertically, a bearing pivoted upon a vertical axis at the end of said axle, a spindle rotatably mounted within said bearing, a flexible driving connection between said power shaft and said spindle at a point substantially in alinement with said vertical axis, and a wheel mounted on said spindle.

4. The combination with an axle having a fork at one end thereof comprising a hanger and spaced face plates connecting the inner end of said hanger to said axle at a point spaced inwardly from the end thereof, of braces connecting said face plates with said axle, a shaft journaled upon said axle, extending lengthwise thereof between said braces, and journaled between said face plates, a pair of arms pivoted to the outer ends of said fork, a post pivoted between said arms at the rear thereof, means connected to said post for actuating the arms, an upright provided with a central bearing and fixed between said arms at the forward outer end thereof, a spindle rotatably mounted within said bearing, and a flexible driving connection between said spindle and the outer end of said shaft at a point substantially in alinement with the axis of said arms.

5. The combination with an axle having a fork at one end comprising a hanger and face plates connecting the opposite sides of said hanger with the opposite sides of said axle at points spaced inwardly from the end of said axle, of a bearing slidable vertically and mounted between said face plates, means for preventing the transverse movement of said bearing, a shaft journaled upon said axle and provided with a reduced portion mounted within said bearing, said shaft providing a shoulder adjacent said reduced portion at one side of the bearing, a gear providing a stop at the opposite side of the bearing, a second bearing pivotally mounted between the ends of said fork, a spindle rotatably mounted within said second bearing, a gear upon the inner end of said spindle meshing with said first-mentioned gear, and a wheel mounted on said spindle.

6. The combination with an axle, of a hanger at one side of one end of said axle, face plates connecting the inner ends of said hanger with said axle at points spaced inwardly of the end thereof forming a fork, a bearing slidable vertically between said face plates and held against movement transversely thereof, a shaft journaled upon said axle and provided with a reduced portion within said bearing whereby said shaft is held against transverse movement but allowed vertical movement with the bearing, a socket gear fixed to the outer end of said shaft and mounted within said fork, the end of said axle and of said hanger being bifurcated, rearwardly extending arms pivoted in said bifurcations, an upright having a central bearing fixed to said arms and facing said socket gear at the outside thereof, a spindle rotatably mounted within said central bearing and having a ball gear at its inner end meshing with said socket gear, and a wheel on said spindle.

7. The combination with an axle having a fork at one end, of a power shaft journaled upon said axle and provided at one end within the fork with a socket gear having a beveled outer edge, a bearing pivoted to the outer ends of said fork upon a vertical axis and provided with a central bearing outside of said socket gear, a spindle rotatably mounted within said bearing and provided at its inner end with a ball gear meshing with said socket gear; said spindle and bearing being beveled to coöperate with the beveled portions of the socket gear whereby the spindle may be moved through a large arc around said vertical axis without disconnecting the power, and a wheel mounted on said spindle.

8. The combination with an axle, of a power shaft mounted upon said axle and extending lengthwise thereof, a bearing pivoted to the end of said axle upon a vertical axis, a spindle rotatably mounted within said bearing, a flexible driving connection between the outer end of said power shaft and the inner end of said spindle at a point substantially in alinement with said vertical axis, a wheel rotatably mounted upon the outer end of said spindle, and means for clutching said wheel to the spindle when it is rotating to move the vehicle forwardly and for unclutching the same when the spindle is rotated to move the vehicle rearwardly.

9. The combination with an axle, of a bearing mounted thereon, a spindle journaled within said bearing, anti-friction bearings interposed between said first-mentioned bearing and said spindle, a washer upon said spindle and engaging the outer side of said bearing to retain the antifriction devices in place, a hub mounted upon said spindle and having a recess at its inner end in which said washer and a portion of said bearing lie, and means upon said spindle at the outer end of said hub for clamping the hub to the spindle and against said washer.

10. The combination with an axle, of a bearing pivoted to one end of said axle upon a vertical axis, a power shaft journaled upon said axle, a spindle having a cylindrical portion journaled within said bearing and flexibly connected at its inner end to the end of said power shaft at a point adjacent the vertical axis, anti-friction bearings interposed between the wall of said bearing and said cylindrical portion, means for retaining said anti-friction bearings in position comprising a washer mounted upon said spindle, a hub having a wheel and mounted upon said spindle, and means for retaining said hub on the spindle.

11. The combination with an axle, of a power shaft journaled upon said axle, a bearing pivoted to one end of said axle on a vertical axis, a spindle rotatably journaled within said bearing and having an inner shoulder engaging the same at the inside thereof, anti-friction bearings within said bearing, a washer mounted upon said spindle and engaging the outer side of said bearing to retain the anti-friction devices therein, a flexible driving connection between the inner end of said spindle and said shaft, a hub having a wheel and rotatably mounted upon said spindle and engaging said washer, and means for locking and unlocking said hub to and from the spindle and against the washer.

In testimony, that I claim the foregoing as my own, I have hereto affixed my signature in the presence of two witnesses.

LEE PERKINS $\overset{\text{his}}{\times}$ BIGGERS.
mark

Witnesses.
W. G. McWHERTER,
J. S. TYSON.